United States Patent
Dorai et al.

(10) Patent No.: US 7,382,933 B2
(45) Date of Patent: Jun. 3, 2008

(54) SYSTEM AND METHOD FOR SEMANTIC VIDEO SEGMENTATION BASED ON JOINT AUDIOVISUAL AND TEXT ANALYSIS

(75) Inventors: Chitra Dorai, Chappaqua, NY (US); Ying Li, Mohegan Lake, NY (US); Youngja Park, Edgewater, NJ (US)

(73) Assignee: International Business Machines Corporation, Armonk, NY (US)

( * ) Notice: Subject to any disclaimer, the term of this patent is extended or adjusted under 35 U.S.C. 154(b) by 526 days.

(21) Appl. No.: 11/210,305

(22) Filed: Aug. 24, 2005

(65) Prior Publication Data

US 2007/0055695 A1 Mar. 8, 2007

(51) Int. Cl.
G06K 9/36 (2006.01)
(52) U.S. Cl. .............. 382/276; 382/164; 382/168; 382/171; 382/173
(58) Field of Classification Search ............... 348/672; 358/522; 375/E7.042, E7.085, E7.228; 382/164, 382/168, 171, 173–180; 386/E5.008, E5.048; 702/180; 715/723, FOR. 178
See application file for complete search history.

(56) References Cited

U.S. PATENT DOCUMENTS

2005/0200762 A1* 9/2005 Barletta et al. ............. 348/700
2006/0288291 A1* 12/2006 Lee et al. ................... 715/723

OTHER PUBLICATIONS

Ying Li and C.-C. Jay Kuo, "A Robust Video Scene Extraction Approach to Movie Content Abstraction", Dec. 30, 2002, Integrated Media Systems Center and Department of Electrical Engineering University of Southern California.*
Zhang et al., "Automatic partitioning of full-motion video", Multimedia System (1993) pp. 10-28.
Yeung et al, "Extracting Story Units from Long Programs for Video Browsing and Navigation", IEEE 0-8186-7436-9/96, Proceedings of Multimedia '96, pp. 296-305.
Sundaram et al., "Determining Computable Scenes in Films and their Structures using Audio-Visual Memory Models", Dept. of Electrical Engineering, Columbia University, NY, pp. 1-10, 2000.
Li et al., "A Robust Video Scene Extraction Approach to Movie Content Abstraction", Integrated Media Systems Center and Dept. of Electrical Engineering, University of Southern California, CA, pp. 1-24, 2004.

* cited by examiner

Primary Examiner—Matthew C. Bella
Assistant Examiner—Gregory F Cunningham
(74) Attorney, Agent, or Firm—Duke W. Yee; David Aker; Gerald H. Glanzman

(57) ABSTRACT

System and method for partitioning a video into a series of semantic units where each semantic unit relates to a generally complete thematic topic. A computer implemented method for partitioning a video into a series of semantic units wherein each semantic unit relates to a theme or a topic, comprises dividing a video into a plurality of homogeneous segments, analyzing audio and visual content of the video, extracting a plurality of keywords from the speech content of each of the plurality of homogeneous segments of the video, and detecting and merging a plurality of groups of semantically related and temporally adjacent homogeneous segments into a series of semantic units in accordance with the results of both the audio and visual analysis and the keyword extraction. The present invention can be applied to generate important table-of-contents as well as index tables for videos to facilitate efficient video topic searching and browsing.

1 Claim, 6 Drawing Sheets

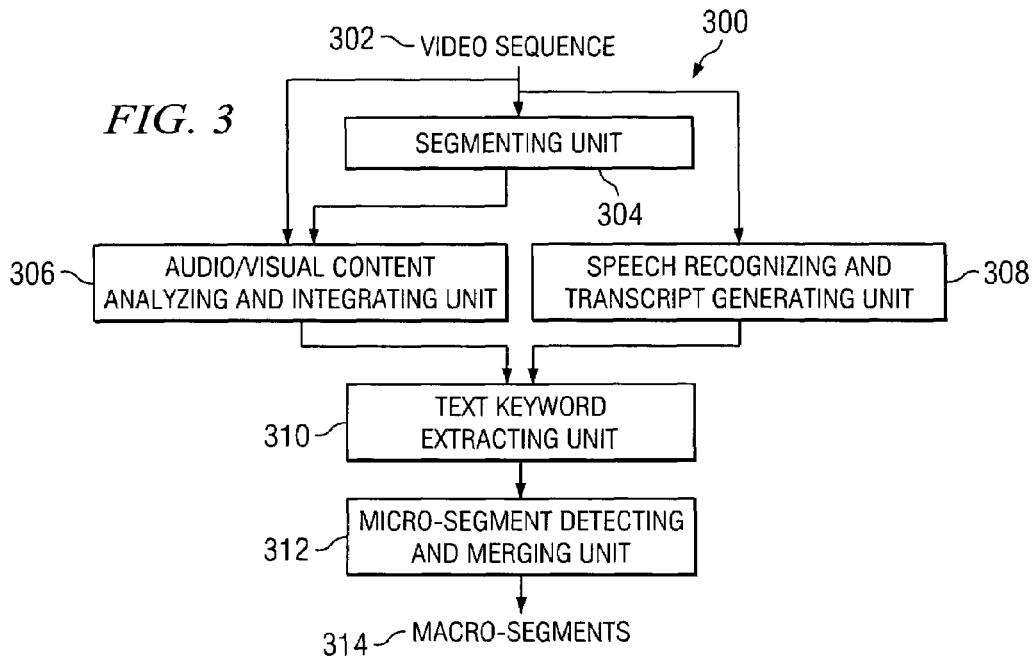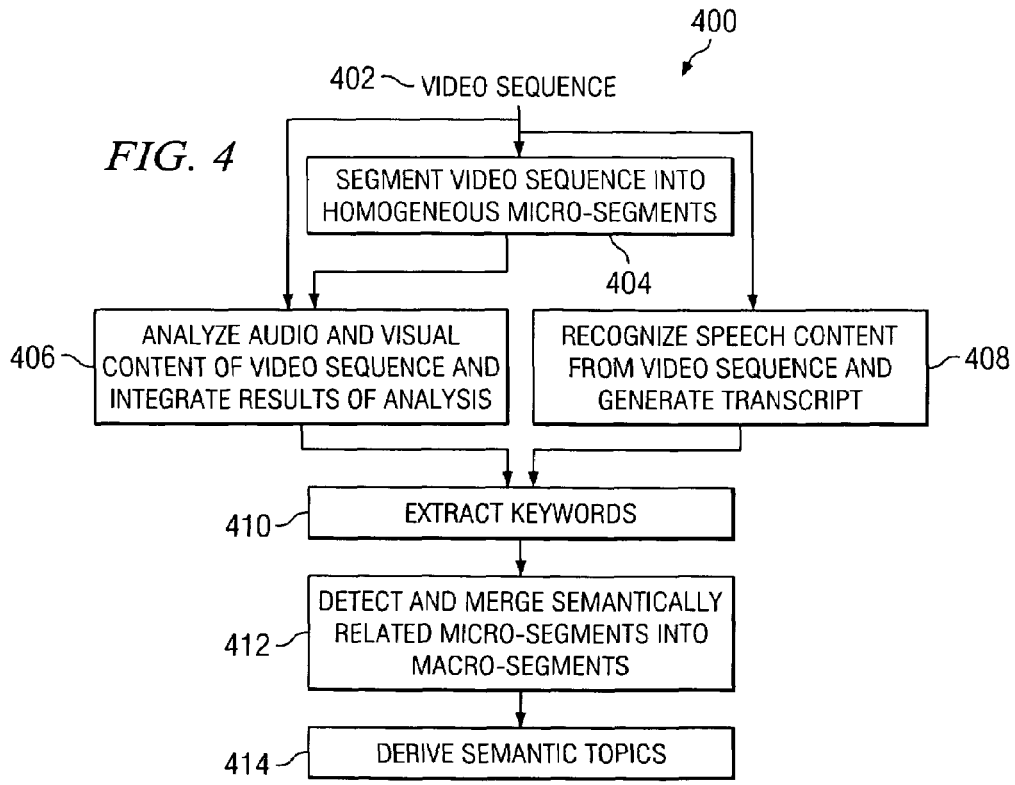

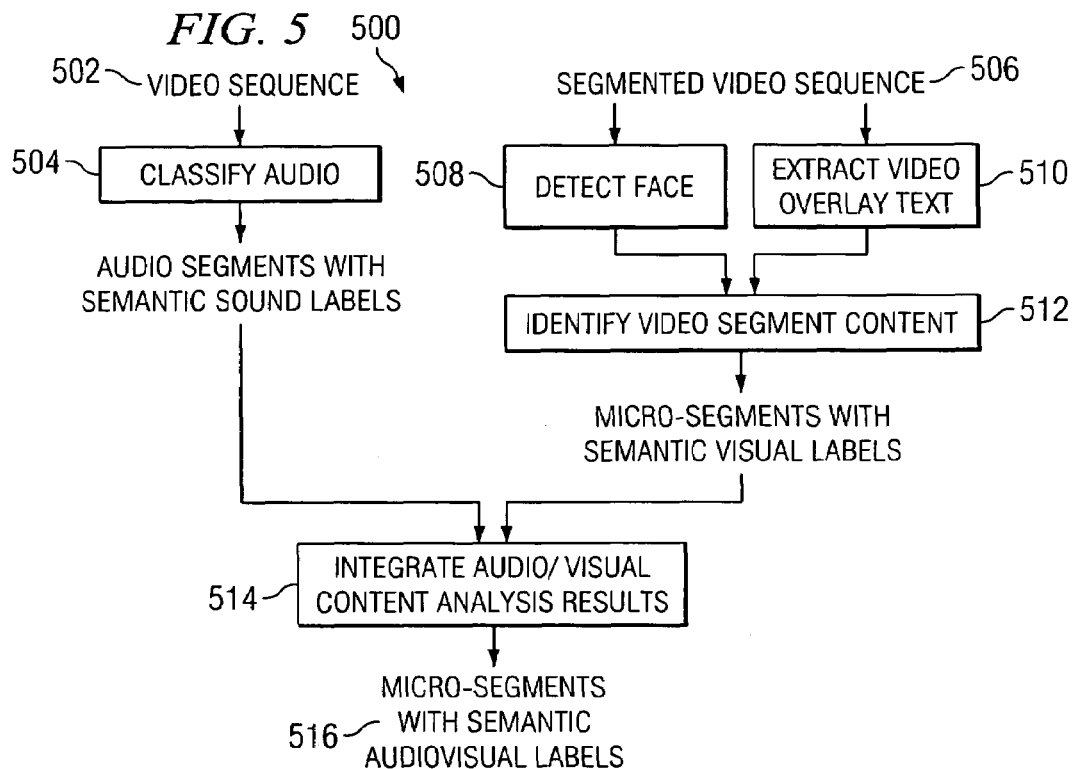
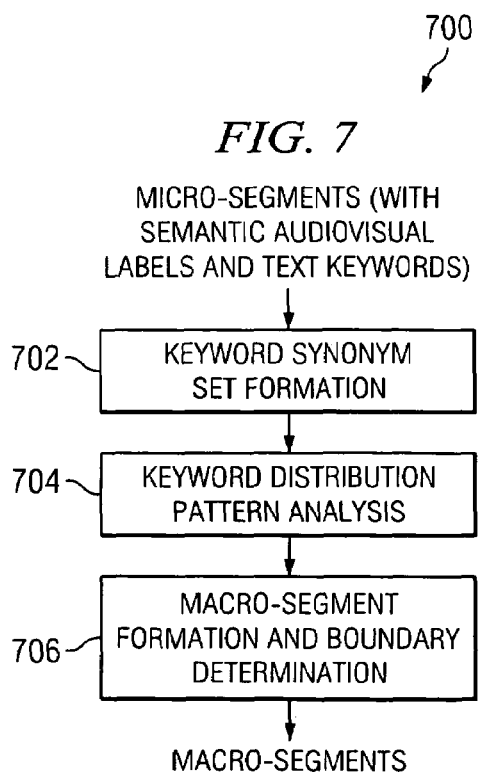

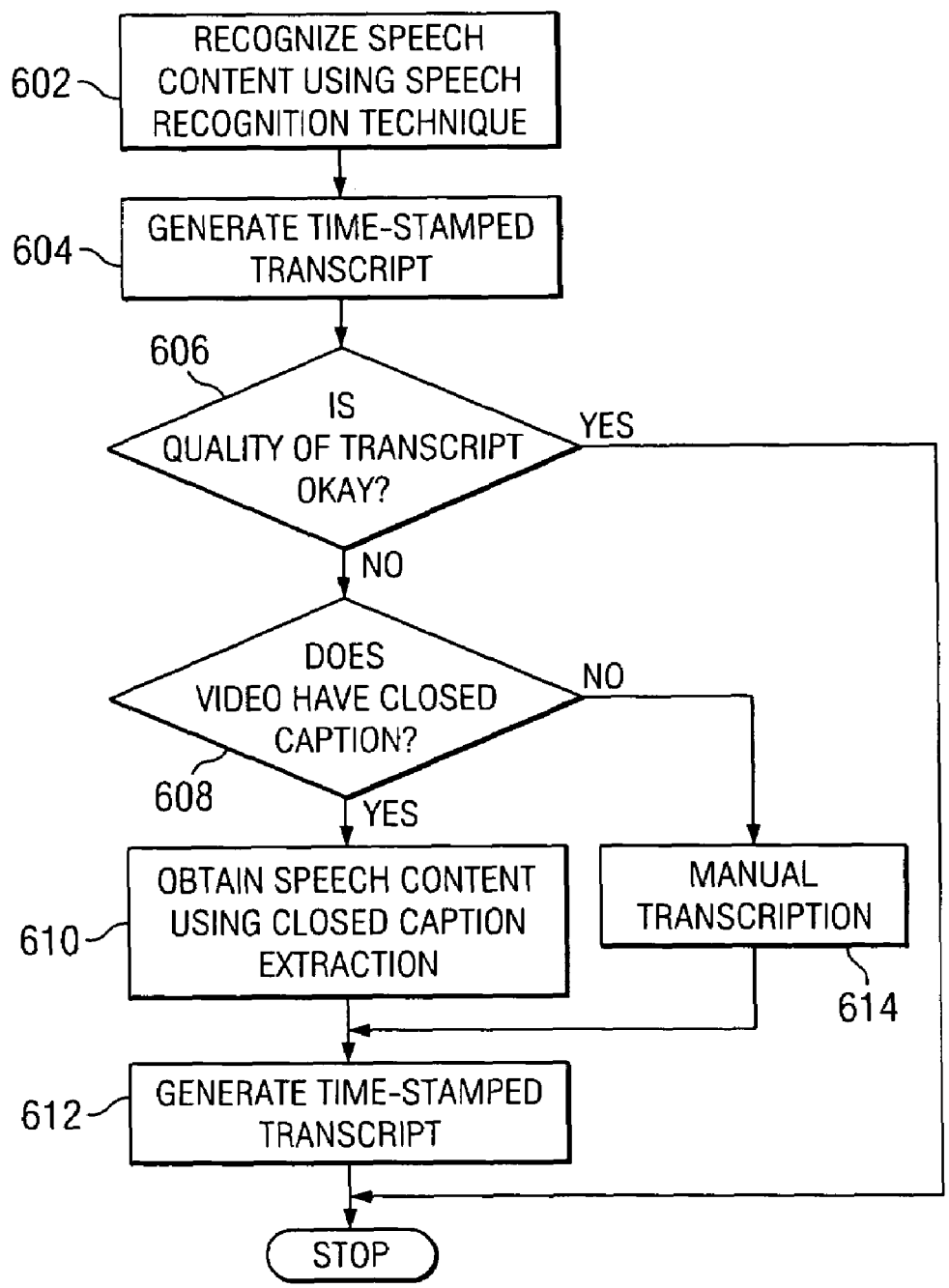

SYSTEM AND METHOD FOR SEMANTIC VIDEO SEGMENTATION BASED ON JOINT AUDIOVISUAL AND TEXT ANALYSIS

GOVERNMENT RIGHTS

This invention was made with Government support under Contract No.: W91CRB-04-C-0056 awarded by the U.S. Army. The Government has certain rights in this invention.

BACKGROUND OF THE INVENTION

1. Field of the Invention

The present invention relates generally to the field of multimedia content analysis, and more particularly, to a system and method for segmenting a video into semantic units using joint audio, visual and text information.

2. Description of the Related Art

Advances in modern multimedia technologies have led to huge and ever-growing archives of videos in various application areas including entertainment, education, training, and online information services. On one hand, this has made digital videos available and accessible to the general public; while on the other hand, it poses great challenges to the task of efficient content access, browse and retrieval.

Consider a video currently available at a website of CDC (Centers for Disease Control and Prevention), as an example. The video is approximately 26 minutes long, and describes the history of bioterrorism. Specifically, the content of the video consists of the following seven parts (in temporal order): overview, anthrax, plague, smallpox, botulism, viral hemorrhagic fevers and tularemia. Meanwhile, this website also contains seven other short video clips, with each clip focusing on one particular content part belonging to the above seven categories.

This availability of individual video segments allows for them to be assembled together as per some course objective, and is further useful in the sense that, when a viewer is only interested in one particular type of disease, he or she can directly watch the relevant video clip instead of looking it up in the original long video using fast forward or backward controls on a video player. Nevertheless, this convenience does not come free. With the current state of technology, it can only be achieved by either manual video segmentation or costly video re-production.

Automatic video segmentation has been a popular research topic for a decade, and many approaches have been proposed. Among the proposed approaches, a common solution is to segment a video into shots where a shot contains a set of contiguously recorded frames. However, while a shot forms the building block of a video sequence in many domains, this low-level structure in itself often does not directly correspond to the meaning of the video. Consequently, most recent work proposes to segment a video into scenes where a scene depicts a higher-level concept. Various approaches have been reported as having received acceptable results. Nevertheless, a scene is still vaguely defined, and only applies to certain domains of video such as movies. In general, semantic understanding of scene content by jointly exploiting various cues in the form of audio, visual information and text available in the video has not been well attempted by previous efforts in the video analysis domain.

It would, accordingly, be advantageous to provide a system and method for segmenting a video sequence into a series of semantic units, with each semantic unit containing a generally complete and definite thematic topic.

SUMMARY OF THE INVENTION

The present invention provides a system and method for partitioning a video into a series of semantic units where each semantic unit relates to a generally complete thematic topic. A computer implemented method for partitioning a video sequence into a series of semantic units wherein each semantic unit relates to a thematic topic, comprises dividing a video into a plurality of homogeneous segments, analyzing audio and visual content of the video, extracting a plurality of keywords from speech content of each of the plurality of homogeneous segments of the video, and detecting and merging a plurality of groups of semantically related and temporally adjacent homogeneous segments into a series of semantic units in accordance with results of both the audio and visual analysis and the keyword extraction.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 3 is a block diagram of a video partitioning system for partitioning a video into a series of semantic units according to an exemplary embodiment of the present invention;

FIG. 4 is a flowchart that illustrates a method for partitioning a video into a series of homogeneous semantic units according to an exemplary embodiment of the present invention;

FIG. 5 is a flowchart that illustrates a method for audio/visual content analysis and integration according to an exemplary embodiment of the present invention;

FIG. 6 is a flowchart that illustrates a method for recognizing speech content from a video and generating its transcript according to an exemplary embodiment of the invention;

FIG. 7 is a flowchart that illustrates a method for merging groups of semantically related video segments into a semantic unit according to an exemplary embodiment of the present invention;

DETAILED DESCRIPTION OF THE PREFERRED EMBODIMENT

Figure 1:
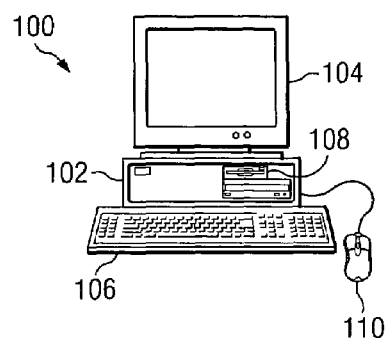
FIG. 1 depicts a pictorial representation of a data processing system in which aspects of the present invention may be implemented.
Figure 2:
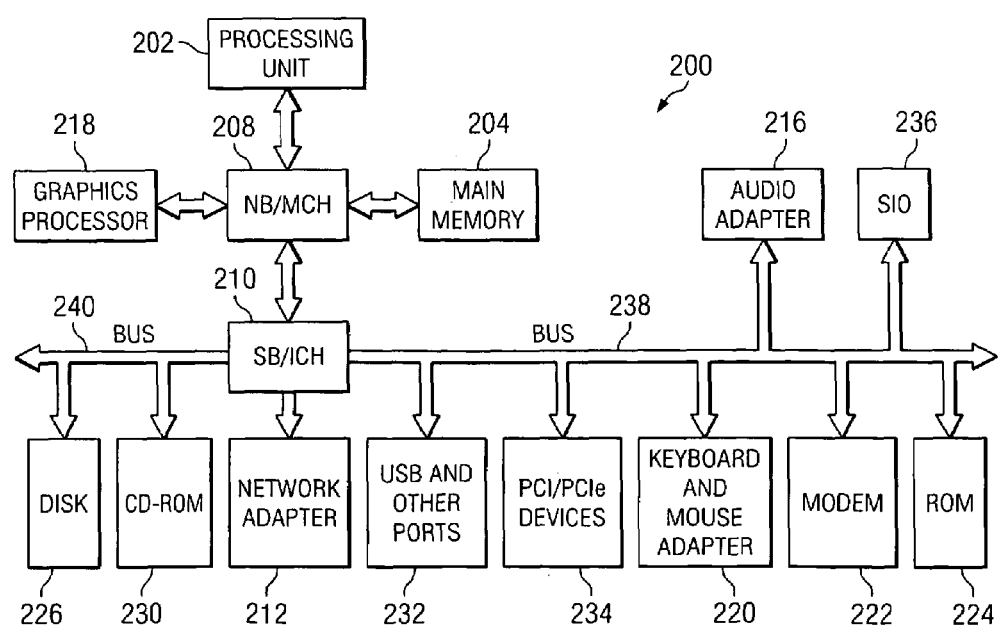
FIG. 2 depicts a block diagram of a data processing system in which aspects of the present invention may be implemented.

FIGS. 1-2 are provided as exemplary diagrams of data processing environments in which embodiments of the present invention may be implemented. It should be appreciated that FIGS. 1-2 are only exemplary and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of a data processing system in which aspects of the present invention may be implemented. A computer 100 is depicted which includes system unit 102, video display terminal 104, keyboard 106, storage devices 108, which may include floppy drives and other types of permanent and removable storage media, and mouse 110. Additional input devices may be included with personal computer 100, such as, for example, a joystick, touchpad, touch screen, trackball, microphone, and the like. Computer 100 can be implemented using any suitable computer, such as an IBM eServer computer or IntelliStation computer, which are products of International Business Machines Corporation, located in Armonk, N.Y. Although the depicted representation shows a computer, other embodiments of the present invention may be implemented in other types of data processing systems, such as a network computer. Computer 100 also preferably includes a graphical user interface (GUI) that may be implemented by means of system software residing in computer readable media in operation within computer 100.

With reference now to FIG. 2, a block diagram of a data processing system is shown in which aspects of the present invention may be implemented. Data processing system 200 is an example of a computer, such as computer 100 in FIG. 1, in which computer usable code or instructions implementing the processes for embodiments of the present invention may be located.

In the depicted example, data processing system 200 employs a hub architecture including north bridge and memory controller hub (MCH) 208 and south bridge and input/output (I/O) controller hub (ICH) 210. Processing unit 202, main memory 204, and graphics processor 218 are connected to north bridge and memory controller hub 208. Graphics processor 218 may be connected to north bridge and memory controller hub 208 through an accelerated graphics port (AGP).

In the depicted example, local area network (LAN) adapter 212, audio adapter 216, keyboard and mouse adapter 220, modem 222, read only memory (ROM) 224, hard disk drive (HDD) 226, CD-ROM drive 230, universal serial bus (USB) ports and other communications ports 232, and PCI/PCIe devices 234 connect to south bridge and I/O controller hub 210 through bus 238. PCI/PCIe devices may include, for example, Ethernet adapters, add-in cards and PC cards for notebook computers. PCI uses a card bus controller, while PCIe does not. ROM 224 may be, for example, a flash binary input/output system (BIOS).

Hard disk drive 226 and CD-ROM drive 230 connect to south bridge and I/O controller hub 210 through bus 240. Hard disk drive 226 and CD-ROM drive 230 may use, for example, an integrated drive electronics (IDE) or serial advanced technology attachment (SATA) interface. Super I/O (SIO) device 236 may be connected to south bridge and I/O controller hub 210.

An operating system runs on processing unit 202 and coordinates and provides control of various components within data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java programs or applications executing on data processing system 200 (Java is a trademark of Sun Microsystems, Inc. in the United States, other countries, or both).

As a server, data processing system 200 may be, for example, an IBM eServer™ pSeries® computer system, running the Advanced Interactive Executive (AIX®) operating system or LINUX operating system (eServer, pSeries and AIX are trademarks of International Business Machines Corporation in the United States, other countries, or both while Linux is a trademark of Linus Torvalds in the United States, other countries, or both). Data processing system 200 may be a symmetric multiprocessor (SMP) system including a plurality of processors in processing unit 202. Alternatively, a single processor system may be employed.

Instructions for the operating system, the object-oriented programming system, and applications or programs are located on storage devices, such as hard disk drive 226, and may be loaded into main memory 204 for execution by processing unit 202. The processes for embodiments of the present invention are performed by processing unit 202 using computer usable program code, which may be located in a memory such as, for example, main memory 204, read only memory 224, or in one or more peripheral devices 226 and 230.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the present invention may be applied to a multiprocessor data processing system.

In some illustrative examples, data processing system 200 may be a personal digital assistant (PDA), which is configured with flash memory to provide non-volatile memory for storing operating system files and/or user-generated data.

A bus system may be comprised of one or more buses, such as bus 238 or bus 240 as shown in FIG. 2. Of course the bus system may be implemented using any type of communications fabric or architecture that provides for a transfer of data between different components or devices attached to the fabric or architecture. A communications unit may include one or more devices used to transmit and receive data, such as modem 222 or network adapter 212 of FIG. 2. A memory may be, for example, main memory 204, read only memory 224, or a cache such as found in north bridge and memory controller hub 208 in FIG. 2. The depicted examples in FIGS. 1-2 and above-described examples are not meant to imply architectural limitations. For example, data processing system 200 also may be a tablet computer, laptop computer, or telephone device in addition to taking the form of a PDA.

The present invention provides a system and method for partitioning a video into a series of semantic units where each semantic unit relates to a generally complete thematic topic. According to an exemplary embodiment of the present invention, this goal is achieved by exploiting multiple media cues including audio and visual information and text cues.

FIG. 3 is a block diagram of a video partitioning system for partitioning a video into a series of semantic units according to an exemplary embodiment of the present invention. The video partitioning system is generally designated by reference number 300, and partitions an incoming video sequence 302 into a plurality of semantic units, referred to herein as "macro-segments" 314, wherein each macro-segment relates to a generally complete thematic topic.

As shown in FIG. 3, video partitioning system 300 includes a segmenting unit 304 for segmenting incoming video sequence 302 into a plurality of homogeneous segments, referred to herein as "micro-segments", audio/visual content analyzing and integrating unit 306 for analyzing the audio and visual content of video sequence 302 and for integrating the results of the analysis, and speech recognizing and transcript generating unit 308 for generating a transcript of what was spoken in video sequence 302. Keyword extracting unit 310 extracts keywords for every micro-segment using the generated transcript and semantically related segments of the video sequence are detected and merged together to form macro-segments 314 by micro-segment detecting and merging unit 312, using the results of both the audio/visual content analysis and the keyword extraction.

FIG. 4 is a flowchart that illustrates a method for partitioning a video into a series of semantic units according to an exemplary embodiment of the present invention. The method is generally designated by reference number 400, and begins by segmenting an incoming video sequence 402 into a plurality of homogeneous micro-segments (Step 404). The segmenting is performed based on color information contained in the video sequence. In particular, color data is gathered from the video sequence, and a color histogram is generated for each frame in the video sequence. An abrupt color histogram change between neighboring video frames signifies visual content change in the video sequence, which provides a good demarcation for creating a series of distinct, homogeneous micro-segments. It should be understood, that creating micro-segments based on color information is intended to be exemplary only, and that other mechanisms may also be used to segment the video sequence into micro-segments without departing from the scope of the present invention.

The method then proceeds with the parallel steps of analyzing the audio/visual content of incoming video sequence 402 and integrating the results of the analysis (Step 406), and recognizing speech content from the video sequence and generating a transcript of the speech content (Step 408).

FIG. 5 is a flowchart that illustrates a method for audio/visual content analysis and integration according to an exemplary embodiment of the present invention. The method is generally designated by reference number 500, and may be implemented as Step 406 in FIG. 4. As shown in FIG. 5, audio content of incoming video sequence 502 is analyzed by applying an audio classification scheme to the audio track of the video sequence to generate a sequence of audio segments with each audio segment having a distinct semantic sound label such as speech, silence, music, environmental sound, etc. (Step 504).

The visual content of the segmented video sequence 506, i.e. each micro-segment, is analyzed based on detected human faces (Step 508) and on extracted video overlay text in the frames of the micro-segments (Step 510). As a result of this visual content analysis, each micro-segment is classified into one of three classes or semantic visual labels (Step 512). These three classes include narrator, informative text (such as a segment showing presentation slides), and linkage scene (such as outdoor scene, indoor demo, etc.).

The results of the audio and visual analysis are then integrated together (Step 514), such that each micro-segment is tagged with a distinct semantic audio/visual label as shown at 516. According to an exemplary embodiment of the present invention, the semantic audio/visual labels are one of the following fifteen types: narrator presentation, narrator with environmental audio background, narrator with audio silence, narrator with music playing, narrator presentation with music playing, informative text with voice-over, informative text with environmental audio background, informative text with audio silence, informative text with music playing, informative text with voice-over and music, linkage scene with voice-over, linkage scene with environmental audio background, linkage scene with audio silence, linkage scene with music playing, and linkage scene with voice-over and music.

Returning to FIG. 4, speech recognition and transcript generating Step 408 comprises recognizing the speech content of the video sequence and creating a time-stamped transcript of the speech content. FIG. 6 is a flowchart that illustrates a method for recognizing speech content from a video and generating a transcript of the extracted speech content according to an exemplary embodiment of the invention. The method is generally designated by reference number 600, and may be implemented as Step 408 in FIG. 4. As shown in FIG. 6, the method begins by recognizing the speech content of the incoming video sequence directly by using speech recognition techniques (Step 602). A time-stamped transcript of the recognized speech content is then generated (Step 604), and a determination is made if the transcript is of acceptable quality (Step 606). If the transcript is of acceptable quality (Yes output of Step 606), the method ends. If the quality of the transcript is not acceptable (No output of Step 606), a determination is made whether the video has closed caption (Step 608). If the video has closed caption (Yes output of Step 608), the speech content of the video is obtained using closed caption extraction (Step 610), a time-stamped transcript of the obtained speech content is generated from the obtained speech content (Step 612), and the method ends. If the video does not have closed caption (No output of Step 608), a manual transcript of the speech content is generated, for example, using a manual speech transcribing service (Step 614), a time-stamped transcript of the manual transcription is generated (Step 612), and the method ends.

In general, a manual speech transcribing service is used to generate the transcript only in a worst case scenario, when satisfactory transcripts cannot be obtained by either speech recognition or closed caption extraction.

Returning again to FIG. 4, following speech content recognition and transcript generating Step 408, keywords are extracted from the transcript to provide a list of domain-specific keywords for each micro-segment (Step 410). Keyword extraction is performed by first recognizing content words or phrases (for instance, noun phrases and verbs) in the text by using linguistic knowledge and then domain specificity and cohesion of content words or phrases are computed based on their statistical information. Highly cohesive domain-specific content words are selected as keywords.

The audiovisual analysis results from Step 406 and the extracted keywords from Step 410 are then combined together, and semantically related micro-segments are detected and merged into macro-segments (Step 412). FIG. 7 is a flowchart that illustrates a method for merging groups of semantically related video segments into a semantic unit according to an exemplary embodiment of the present invention. The method is generally designated by reference number 700, and may be implemented as Step 412 in FIG. 4. The method involves performing the three steps described below.

Step 702: Group all extracted keywords into a collection of synonym sets. Each synonym set contains words of identical or similar meanings although their morphologies could be varied. Words of identical meaning include abbreviations (e.g., "WMD" for 'weapons of mass destruction'), alternative spellings (e.g., "anaesthesia" for "anesthesia"), or orthographical variations (e.g., "audio/visual input", "audiovisual input" and "audio-visual input"). Abbreviations can be identified by using a pre-compiled lexicon or matched on the fly by applying natural language processing (NLP) techniques. Alternative spellings and orthographic variants can be recognized by lexical pattern processing.

Words of similar meanings include synonyms. For instance, words such as contagious, epidemiology, epidemic, infectious, infect, infection, plague and infest, are qualified to be grouped into a single synonym set. This captures the word correlation effect. The formation of synonym sets could be achieved using various existing techniques. One approach is to use a lexical taxonomy such as the WordNet, which provides word meanings and other semantically related words. Another approach is to apply natural language processing and machine learning techniques such as support vector machine (SVM) or latent semantic index (LSI) to find semantically related words and to form word clusters of similar meaning.

Step 704: For each synonym set S whose cardinality exceeds a certain threshold (i.e., it contains a sufficient number of words), find its distribution pattern across all micro-segments. In other words, find the micro-segments which have one or more keywords belonging to set S. Then, build set S's keyword occurrence histogram H, whose x-axis indicates the micro-segments and whose y-axis specifies the keyword occurrence frequency.

Figure 8A:
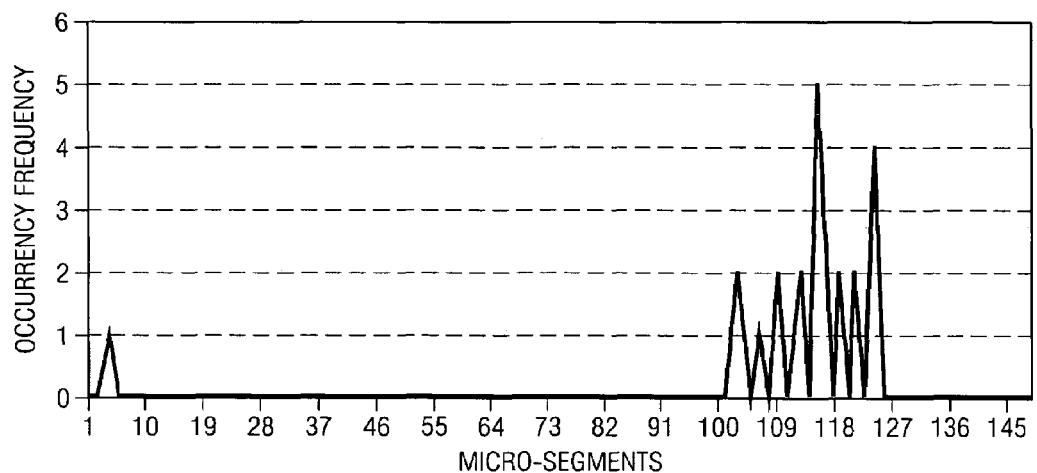
FIGS. 8A and 8B illustrate two typical keyword occurrence histograms to assist in explaining the present invention.
Figure 8B:
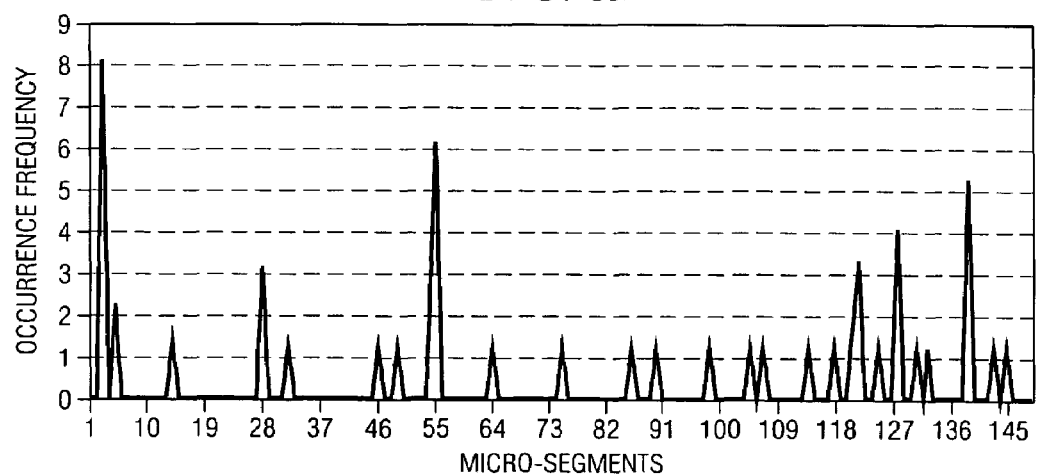

FIGS. 8A and 8B illustrate two typical keyword occurrence histograms to assist in explaining the present invention. FIG. 8A is a keyword occurrence histogram 800 that shows a keyword occurrence for a particular set $S_0$, where the word distribution is rather restricted to certain micro-segments. In contrast, FIG. 8B is a keyword occurrence histogram 850 that shows the distribution of another synonym set $S_1$ that is fairly uniform across all micro-segments. As is apparent from FIGS. 8A and 8B, a keyword occurrence histogram effectively captures the temporal correlation of the keywords.

Based on this observation, it could be concluded that, if set S's keyword occurrence histogram displays a distinct peak restricted to a certain temporal period, as shown in FIG. 8A, then very possibly, it contains keywords related to a specific sub-topic (e.g. smallpox). Consequently, all micro-segments within this temporal period should be semantically related. On the other hand, if the distribution is rather uniform across the entire video, as shown in FIG. 8B, then very likely, it contains keywords related to the general video topic (e.g., bioterrorism) instead of a specific topic.

Step 706: Group all micro-segments, which are temporally adjacent and semantically related, into a macro-segment based on the decision made in Step 704. The challenge of this step is to locate the precise macro-segment boundaries where the thematic topics change. This can be solved by incorporating the pre-obtained audiovisual analysis results based on the following two observations.

Observation 1), it is noticed that for most professionally produced videos, there is a relatively long period of silence and/or music between two macro-segments of different topics.

Figure 9:
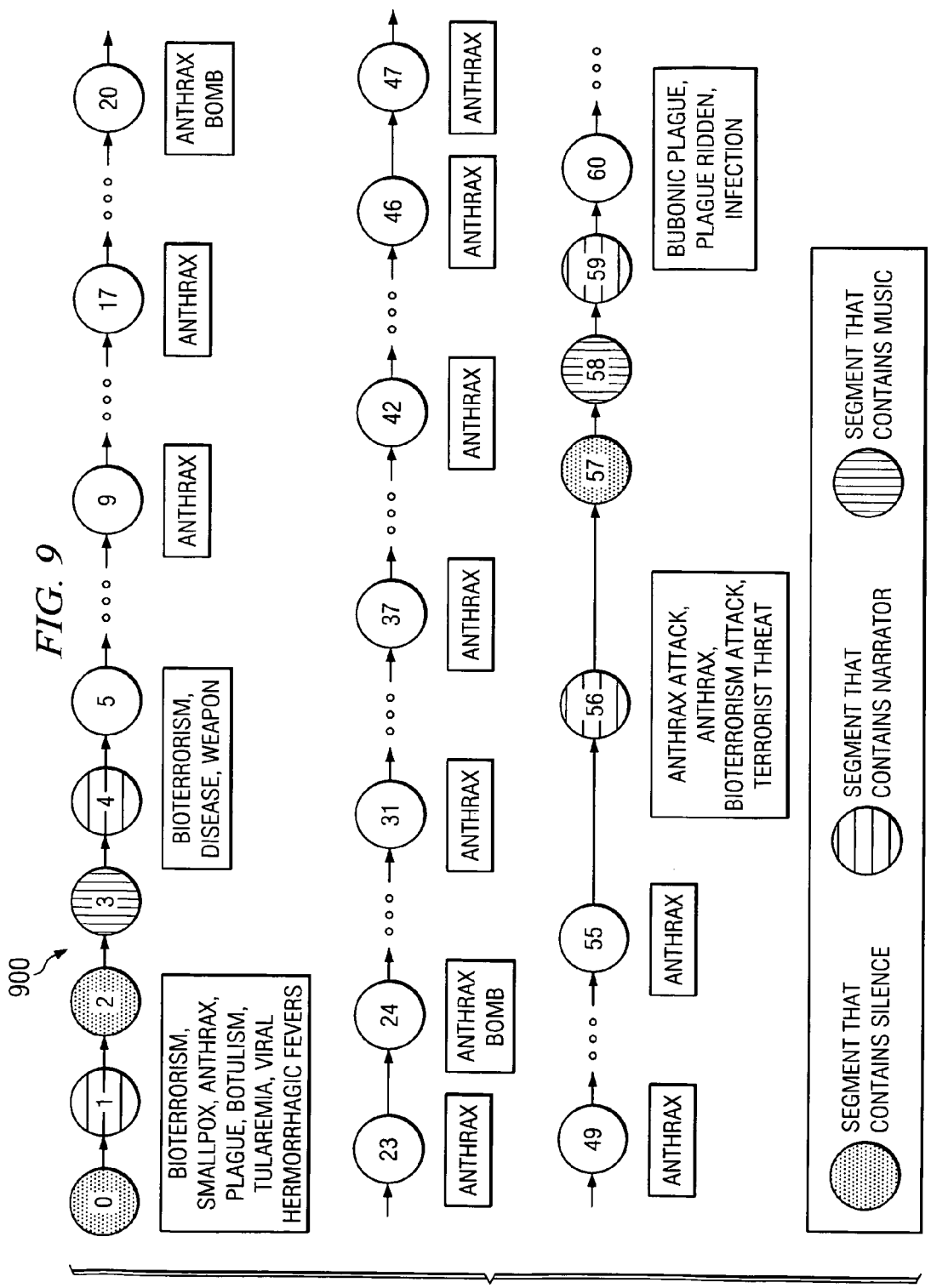
FIG. 9 is a diagram that illustrates a keyword transition graph for a video according to an exemplary embodiment of the present invention.

FIG. 9 is a diagram that illustrates a keyword transition graph for a video according to an exemplary embodiment of the present invention. In particular, FIG. 9 is a diagram that illustrates a keyword transition graph for the example CDC video described previously. In FIG. 9, each illustrated node represents one micro-segment while the number associated with each node indicates the micro-segment index. The extracted text keywords for each micro-segment are displayed below each node. In addition, shaded nodes such as, for example, nodes 0 and 2, are used to identify nodes that contain silence, nodes that are filled with horizontal lines, such as nodes 1 and 4, identify nodes that contain narrator, nodes that are filled with vertical lines, such as nodes 3 and 58, identify nodes that contain music.

From an examination of FIG. 9, it should be clear that the keyword "anthrax" has a very high occurrence frequency during the period from segment 9 to segment 56. This demonstrates that all these segments are very likely related with each other on the "anthrax" topic. Consequently, they should be merged into one macro-segment. Moreover, it is also noticed that there are silence and music nodes around nodes 9 and 56, which could be used as natural macro-segment boundaries.

Observation 2), it is also observed that narrator shots usually appear when a new topic is initiated or the previous topic ends. This is also confirmed in FIG. 9, where node 4 leads the macro-segment that discusses "anthrax". Also, node 59 leads the macro-segment whose topic is now on "plague".

Based on these two observations, the macro-segment boundaries are determined as follows:

1) find the micro-segments that will be grouped into one macro-segment from the keyword occurrence histogram. Denote the leading and tailing segments of this macro-segment as SL and ST, respectively; and 2) locate the silence/music micro-segments around SL and ST, and designate them as the boundaries. If no such segments exist, then locate narrator segments instead, and assign them as the separators. If, in the worst case, everything fails, treat SL and ST as the boundaries.

Referring back to FIG. 4, after the semantically related and temporally adjacent micro-segments have been detected and merged into macro-segments (Step 412), the semantic topic for each macro-segment is derived by grouping the keywords from its component micro-segments, ranking them based on their occurrence frequencies, and selecting a few top ones as the topic keywords (Step 414).

The present invention thus provides a system and method for partitioning a video into a series of semantic units where each semantic unit relates to a generally complete thematic topic. A computer implemented method for partitioning a video sequence into a series of semantic units wherein each semantic unit relates to a thematic topic, comprises dividing a video into a plurality of homogeneous segments, analyzing audio and visual content of the video, extracting a plurality of keywords from speech content of each of the plurality of homogeneous segments of the video, and detecting and merging a plurality of groups of semantically related and temporally adjacent homogeneous segments into a series of semantic units in accordance with results of both the audio and visual analysis and the keyword extraction.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for partitioning a video into a series of semantic units wherein each semantic unit relates to a thematic topic, the method comprising:
   dividing the video into a plurality of homogeneous segments, wherein dividing the video into the plurality of homogeneous segments further comprises:
      generating a color histogram for each video frame of the video;
      identifying abrupt video content changes based on a detection of abrupt histogram change in neighboring video frames; and
      dividing the video into the plurality of homogeneous segments based on the abrupt video content changes identified in the video;
   analyzing audio and visual content of the video, wherein analyzing the audio and the visual content of the video further comprises:
      classifying an audio track of the video to provide a sequence of audio segments having distinct semantic sound labels;
      classifying the visual content of each of the plurality of homogeneous segments to provide a plurality of homogeneous segments having semantic visual labels; and
      integrating the sequence of audio segments having distinct semantic sound labels and the plurality of homogeneous segments having semantic visual labels to provide homogeneous segments having semantic audio and visual labels;
   extracting a plurality of keywords from speech content of each of the plurality of homogeneous segments of the video, wherein extracting the plurality of keywords from the speech content further comprises:
      recognizing the speech content of the video directly using automatic speech recognition techniques;
      generating a time-stamped transcript of the speech content to form directly recognized speech content by attaching time-stamps to at least one of words, phrases, or sentences; and
      responsive to a determination that the directly recognized speech content is unsatisfactory, indirectly obtaining a speech transcript of the video, wherein indirectly obtaining the speech transcript of the video further comprises:
         extracting the plurality of keywords from the time-stamped transcript generated for each of the plurality of homogeneous segments of the video, wherein extracting the plurality of keywords from the time-stamped transcript further comprises:
            recognizing content words or phrases in the time-stamped transcript;
            calculating domain specificity and cohesion of the content words or phrases recognized based on their statistical information; and
            selecting highly cohesive domain-specific content words as the plurality of keywords;
   detecting and merging a plurality of groups of semantically related and temporally adjacent homogeneous segments into a series of semantic units in accordance with results of both the audio and the visual analysis and the plurality of keywords from the speech content extraction, wherein detecting and merging a plurality of groups of semantically related and temporally adjacent homogeneous segments into the series of semantic units further comprises:
      grouping the plurality of keywords extracted into a collection of synonym sets;
      determining a distribution pattern across the plurality of homogeneous segments for each of the synonym sets by building a keyword occurrence histogram for each of the synonym sets, wherein the synonym sets comprise words of identical or similar meanings; and
      grouping the plurality of homogeneous segments which are temporally adjacent and semantically related into a semantic unit of the series of semantic units based on the distribution pattern by locating boundaries of the semantic unit where thematic topics change using results from the audio and the visual content analysis, wherein locating the boundaries of the semantic unit where the thematic topics change further comprises:

finding the plurality of homogeneous segments that will be grouped into the semantic unit;

denoting leading and trailing homogeneous segments of the semantic unit;

locating silence and music homogeneous segments around the leading and trailing homogeneous segments of the semantic unit;

locating narrator homogeneous segments; and designating the silence and music homogeneous segments as the boundaries, or, if the silence and music homogeneous segments are not present, designating the narrator homogeneous segments as separators of the semantic unit; and deriving a theme or a topic for each of the series of semantic units.

* * * * *